United States Patent [19]
Lenton

[11] Patent Number: 4,563,562
[45] Date of Patent: Jan. 7, 1986

[54] HOT WIRE WELDER

[75] Inventor: Kenneth G. Lenton, Lethbridge, Canada

[73] Assignee: Versatile Corporation, Vancouver, Canada

[21] Appl. No.: 425,054

[22] Filed: Sep. 27, 1982

[51] Int. Cl.$^4$ ............................................. B23K 11/00
[52] U.S. Cl. ............................ 219/76.11; 219/76.17; 219/77
[58] Field of Search ............ 219/76.11, 76.14, 137.61, 219/77, 137.62, 76.1, 76.13, 137.2, 76.17; 228/229

[56] References Cited
U.S. PATENT DOCUMENTS
2,302,781 11/1942 LaForce ......................... 219/137.61
3,924,092 12/1975 Lessmann et al. ............... 219/76.11

*Primary Examiner*—C. L. Albritton
*Assistant Examiner*—Alfred S. Keve
*Attorney, Agent, or Firm*—Wenderoth, Lind & Ponack

[57] ABSTRACT

A hot wire welder comprises a plurality of longitudinal tubes with welding wire moving through the tubes. At one end, buss bars pass power to the wires as they emerge from the tubes. Replaceable copper inserts are positioned between the wires and the buss bars. A replaceable ceramic insert is positioned below the wire on a water-cooled cooling block to insulate each wire and remove excess heat. A drive device powers the wires through the longitudinal tubes.

13 Claims, 7 Drawing Figures

HOT WIRE WELDER

INTRODUCTION

This invention relates to a hot wire welder and, more particularly, to a hot wire welder used to deposit a hard facing on a metal surface.

BACKGROUND OF THE INVENTION

Welders are known that deposit a hard facing on a metallic surface. These welders have been labor intensive; that is, the deposited material has been in the form of welding rods before deposition which rods are inserted in a rod guide. As each rod became used, a new rod was manually inserted in each opening in the rod guide. The rods were melted with a gas flame.

Continuous wire deposition was suggested. Continuous wire deposition, while more efficient, caused excessive heat in the area of metal deposition which affected the longevity of the wire guiding tubes and other apparatus in the vicinity of the deposition area.

SUMMARY OF THE INVENTION

According to the invention, there is disclosed a hot wire welder comprising at least two longitudinal tubes, each tube being adapted to carry a respective welding wire, a longitudinal buss bar for each tube operable to carry power and apply it to said welding wires adjacent the welding area, a guide holder adapted to hold said tubes, a backing block spaced from said guide holder towards said welding area in contact with said welding wires and drive means to drive said wire through said tubes, said guide holder and backing block being connected to a cooling block cooled by a water circulating within said cooling block.

BRIEF DESCRIPTION OF THE SEVERAL VIEWS OF THE DRAWINGS

The invention will now be described, by way of example only, with the use of drawings in which.

DESCRIPTION OF SPECIFIC EMBODIMENT

Figure 1:
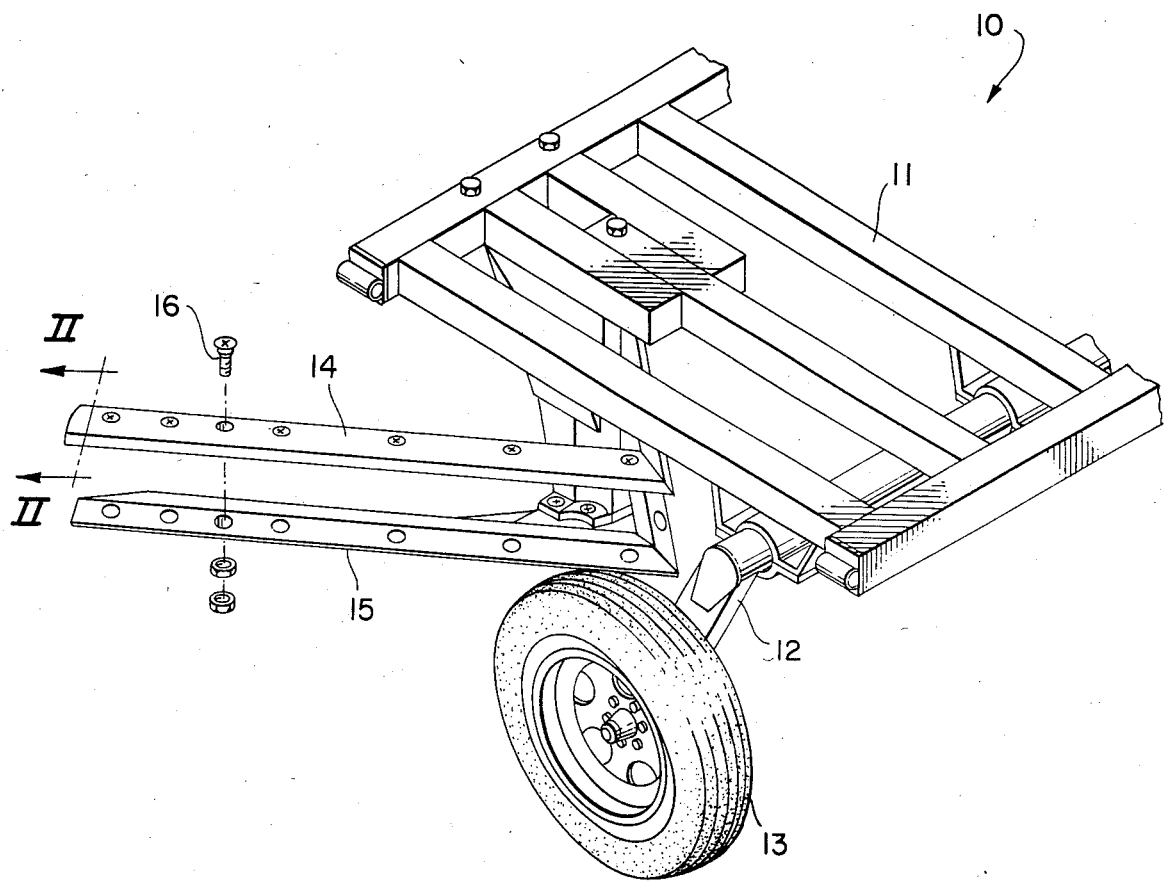
FIG. 1 is a partial view of a blade cultivator.

Referring now to the drawings, one area of a blade cultivator is shown generally at 10 in FIG. 1 and comprises a frame 11 and a vertical adjustment device 12 attached to ground wheel 13. Blade 14 is rigidly attached to a supporting base 15 by the use of bolts 16.

Figure 2:
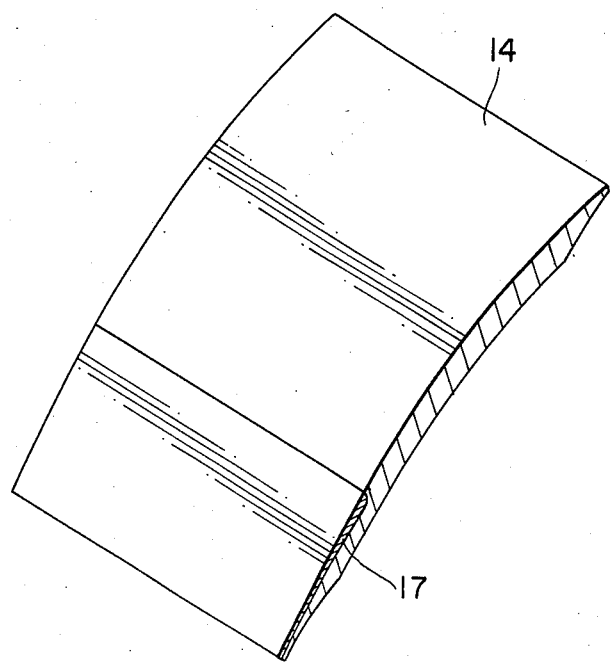
FIG. 2 is a sectional view taken along II—II of FIG. 1.

A cross-section of the blade 14 is taken along II—II of FIG. 1 and is shown in section in FIG. 2. Blade 14 has a hard facing 17 in the nature of a carbide material at the leading edge of the blade to improve the cutting edge characteristics and blade longevity.

Figure 3:
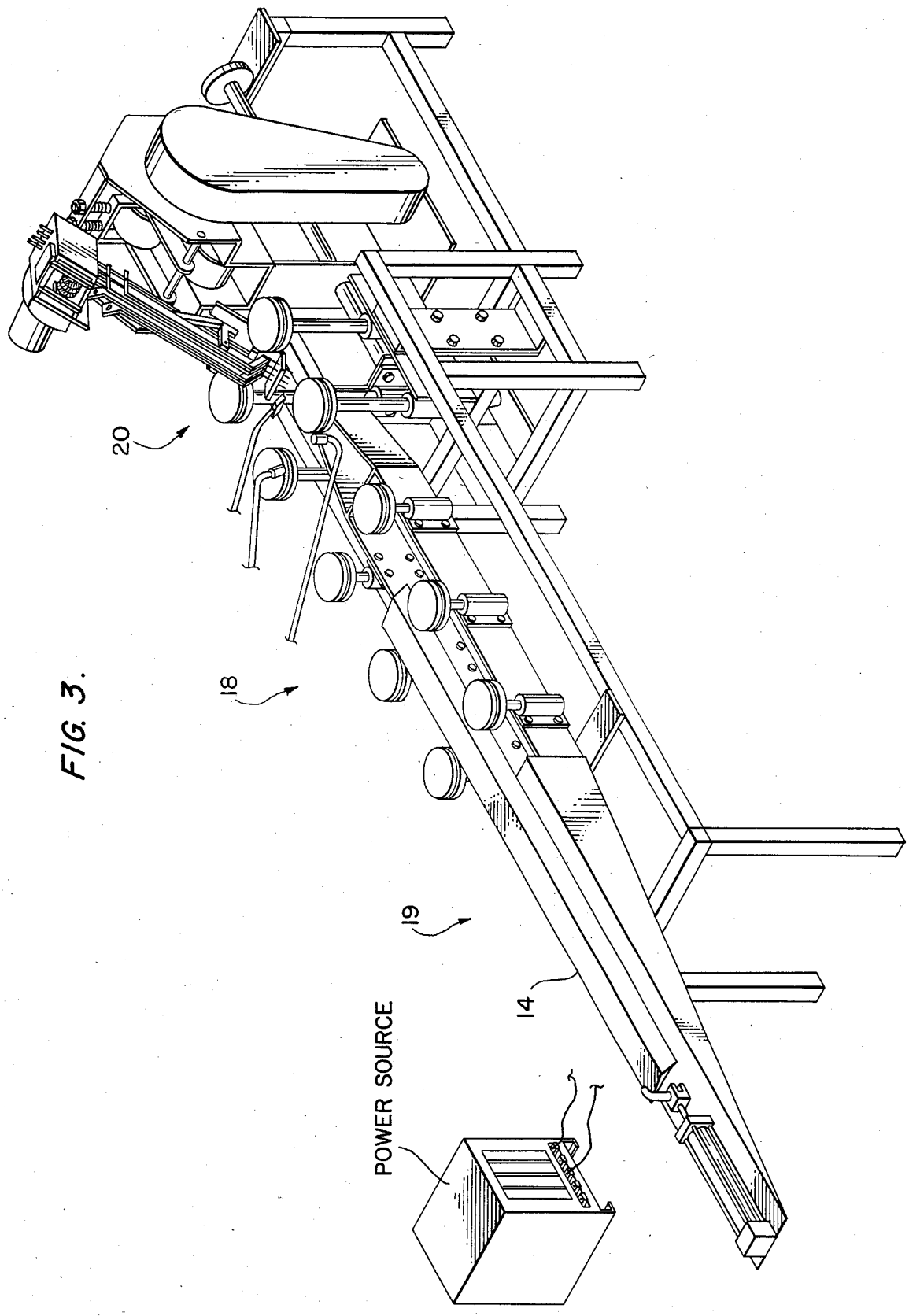
FIG. 3 depicts a hard facing machine.

A hard facing machine to deposit the carbide material is shown generally at 18 in FIG. 3. It is used for depositing the carbide layer 17 on the material of blade 14. The machine comprises a drive mechanism shown generally at 19 and a metal deposition mechanism shown generally at 20. The drive mechanism 19 is more fully described in our co-pending U.S. application Ser. No. 247,505, now U.S. Pat. No. 4,377,126, and will not be further described here.

Figure 4:
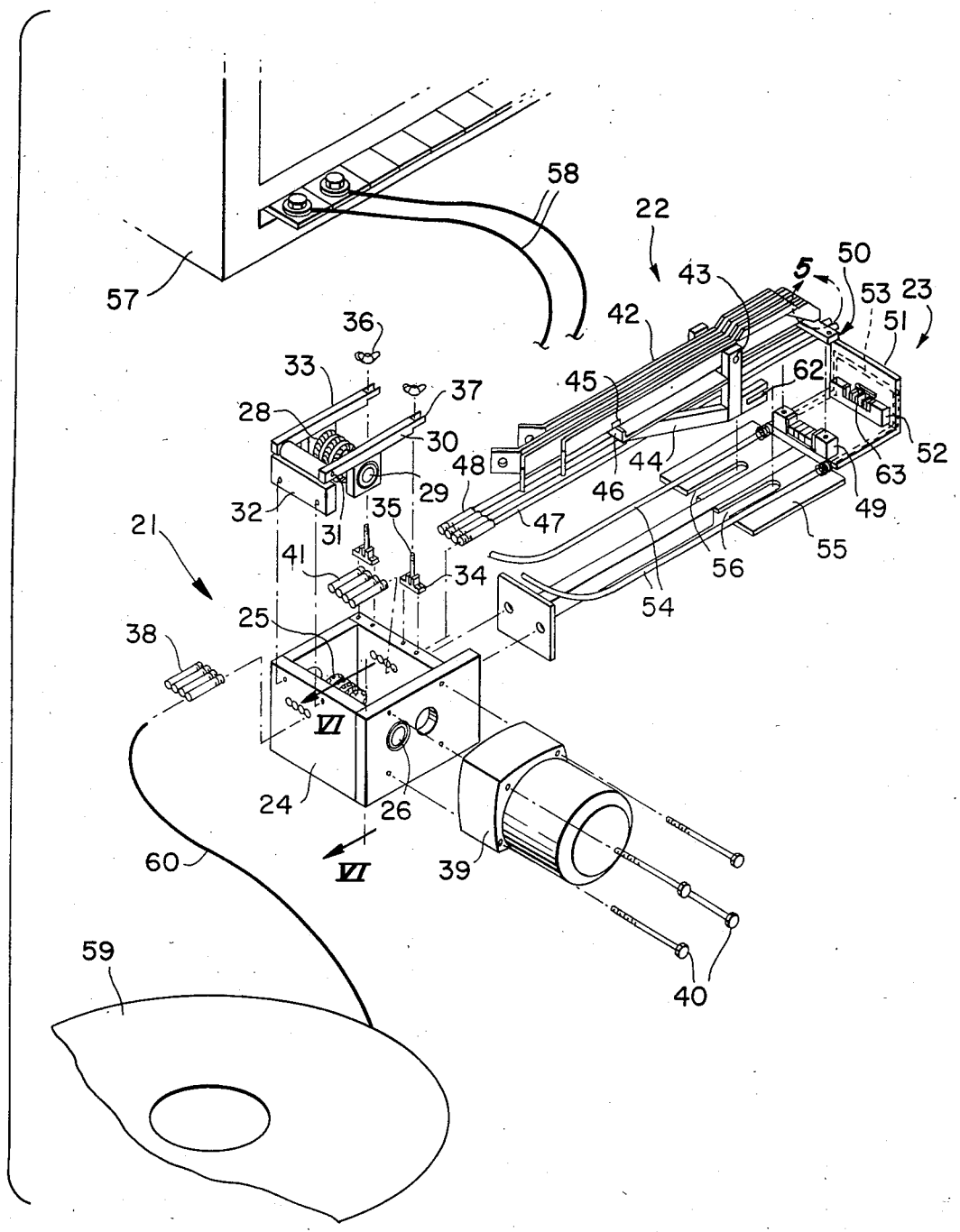
FIG. 4 is an exploded view of the hot wire deposition or welder unit.

The metal deposition mechanism 20 is shown in exploded view in FIG. 4. It comprises three principal mechanisms, namely the wire feeder mechanism shown generally at 21, the wire conveying mechanism shown generally at 22 and the hard facing deposition mechanism shown generally at 23.

Figure 6:
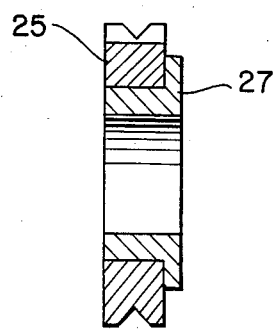
FIG. 6 is a sectional view of a drive idler taken along VI—VI of FIG. 5.

Referring to the wire feeder mechanism 21, a wire feeder housing 24 houses drive rollers 25. Drive rollers 25 are geared and mounted on a shaft 26 together with a phenolic insulator 27 (see FIG. 6) which is mounted beneath each drive roller 25. The shaft 26 together with drive rollers 25 is mounted in wire feeder housing 24.

A set of complementary idler rollers 28 is likewise mounted on a shaft 29 which, in turn, is mounted in cradle frame 30. Cradle frame 30 has a pivotal connection 31 to block 32 which is connected to wire feeder housing 24 as indicated. Idler pressure arms 33 extend forwardly from pivotal connection 31.

Two pressure arm hold down mounts 34 are attached to wire feeder housing 24 and bolts 35 extend upwardly from hold down mounts 34 and protrude through respective recesses 37 in the pressure arms 33. Wing nuts 36 attach to the bolts 35.

Four inlet guides 38 and four outlet guides 41 are inserted into the wire feeder housing 24. Wire feed motor 39 is also attached to wire feeder housing 24 using bolts 40. Wire feed motor 39 drives the drive rollers 25 through a geared connection (not shown).

The wire conveying mechanism shown generally at 22 includes buss bars 42 which have a hole drilled through the central portion. The buss bars 42 are mounted on shaft 43 which is inserted in frame or contact arm holder 44 and which is pivotable about this shaft 43. Recesses 45 are machined in the contact arm holder 44 and compression springs 46 are inserted between the recesses 45 in the buss bars and the contact arm holder 44.

Four longitudinal wire tube guides 47, one for each of the welding wires 60, are located beneath the buss bars 42. Tube guides 48 are connected to one end of the tube guides 47 and, through the threaded connection, are inserted into wire feeder housing 24 as shown.

The opposite ends of the wire tube guides 47 are positioned on the wire tube guide holder 49. A restraining bracket 50 is connected to the wire tube guide holder 49 by bolts and retains the wire tube guides 47 in the wire tube guide holder 49. The wire tube guides 47 extend outwardly from the wire tube guide holder and terminate before reaching the backing block 52.

The wire tube guide holder 49 and the backing block 52 are connected to cooling block 51. The cooling block 51 has a water passage 53 therethrough and water lines 54 are attached to cooling block 51 to provide ingress and egress for the circulating water. The water lines 54 are connected to a water source (not shown).

Figure 5A:
FIGS. 5a and 5b are an enlarged end view and partial cross-sectioned side view of a part shown in FIG. 4.
Figure 5B:
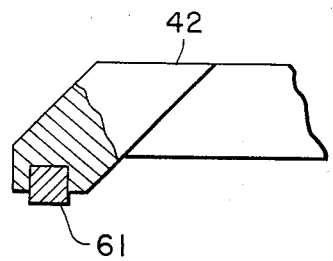

Backing block 52 is made from steel material. Ceramic inserts 63 are designed to be easily replaced and to provide insulation and separation for each wire leaving its respective wire tube guide 47. A plurality of copper inserts 61 (FIGS. 5a and 5b) are positioned, each to its respective welding wire, between the end of the buss bars 42 and the welding wires 60. Thus, the welding wires 60 pass through backing block 52 on one side with copper inserts 61 on the opposite side.

A contact arm holder mounting flange 55 is provided for mounting the contact arm holder or frame 44. Recesses 56 are machined in the flange 55 and arms 62 on contact arm holder 44 have complementary recesses adapted to fit into recesses 56 as shown.

A source of power 57 is provided for the electrical power and power cables 58 provide power to the buss bars 42.

OPERATION

In operation, a blade 14 without hard facing (FIG. 3) is positioned on the hard facing machine 18 where it is conveyed into the metal deposition mechanism 20. Referring to FIG. 4, a reel of welding wire 59 (only one of which is shown) is provided, one for each tube guide 47, and each wire is threaded from its reel through inlet guides 38, between drive and idler rollers 25, 28, respectively, through outlet guides 41, tube guides 48, wire tube guides 47 and between copper inserts 61 and backing block 52.

The power source 57 then provides power to the buss bars 42, the wire feed motor 39 is switched on and water circulation through cooling block 51 commences.

As the welding wires 59 contact the blade material, the welding wires 59 melt and leave the hard facing within the recess of the blade 14 as depicted in FIG. 2.

Depending on various operating conditions, it may be desirable to increase or decrease the speed with which the welding wires 60 are driven by the wire feed motor 39. The wire feed motor 39 is incrementally adjustable and may, therefore, have its speed increased or decreased as desired.

It is necessary to have fairly constant pressure applied to the welding wires 59 by the drive and idler rolls 25, 28 respectively. To that end, the wing nuts 36 may be tightened or loosened as necessary to provide the required pressure.

Since the copper inserts 61 and ceramic inserts 63 are being constantly worn down due to the friction between them and the welding wires, the apparatus has been designed to offer efficient replacement of the inserts 61, 63. The operator removes the arms 62 of contact arm holder 44 from recesses 56 in flange 55. The copper inserts 61 are then fully exposed and may be replaced. Similarly, the inserts 63 are also then fully exposed and may be replaced as desired.

Accordingly, there has been described a particular embodiment of the invention. Many modifications may be made to this embodiment, which modifications will still fall within the scope and spirit of the invention which should be limited, therefore, only by the scope of the accompanying claims.

I claim:

1. A hot wire welder comprising at least two longitudinal tubes, each tube being adapted to carry a respective welding wire, a longitudinal buss bar for each tube operable to carry power and apply it to said welding wires adjacent the welding area, a guide holder adapted to hold said tubes, a backing block spaced from said guide holder towards said welding area in contact with said welding wires and drive means to drive said wire through said tubes, said guide holder and backing block being connected to a cooling block cooled by water circulating within said cooling block.

2. A hot wire welder as in claim 1 wherein each of said buss bars has a copper insert to carry power to each of said welding wires, said inserts being positioned between a respective one of said welding wires and buss bars.

3. A hot wire welder as in claim 2 wherein said inserts are replaceable.

4. A hot wire welder as in claim 3 wherein said welding wires run between said copper inserts and a ceramic insert.

5. A hot wire welder as in claim 4 wherein each of said welding wires is separated by part of said ceramic insert.

6. A hot wire welder as in claim 5 wherein pressure on said welding wire is provided by said buss bars, said buss bars being pivotally connected to a frame and applying pressure on one end of said frame.

7. A hot wire welder as in claim 1 wherein said pressure is provided by compression springs acting between said frame and the end of said buss bar on said pivotal connection opposite to said one end.

8. A hot wire welder as in claim 7 wherein said frame is removably connected to a base.

9. A hot wire welder as in claim 1 wherein said drive means acts to power said welding wire through said longitudinal tubes before said wire enters said longitudinal tubes.

10. A hot wire welder as in claim 9 wherein said drive means comprises a drive roller and idler roller for each welding wire, said drive and said idler rollers being geared.

11. A hot wire welder as in claim 10 wherein said idler rollers are adjustably movable towards and away from said drive rollers.

12. A hot wire welder as in claim 11 wherein said idler rollers are mounted in a frame, said frame being pivotable and wherein said idler rollers are movable towards and away from said drive rolls by said frame moving about said pivot.

13. A hot wire welder comprising at least two longitudinal tubes, each tube being adapted to carry a respective welding wire, a longitudinal buss bar for each tube operable to carry power and apply it through a replaceable copper insert positioned between a respective one of said welding wires and said respective buss bar, each of said welding wires running between said copper inserts and a ceramic insert, each of said welding wires being separated from an adjacent welding wire by part of said ceramic insert, said buss bars being operable to apply pressure on said welding wire and being pivotably connected to a frame, said buss bars having pressure applied on the end of said frame opposed to said end applying pressure on said welding wire.

* * * * *